Aug. 25, 1953
G. O. MONNIG
2,650,107
STABILIZING DEVICE FOR VEHICLES
AND OTHER PURPOSES
Filed Jan. 16, 1950
2 Sheets-Sheet 1
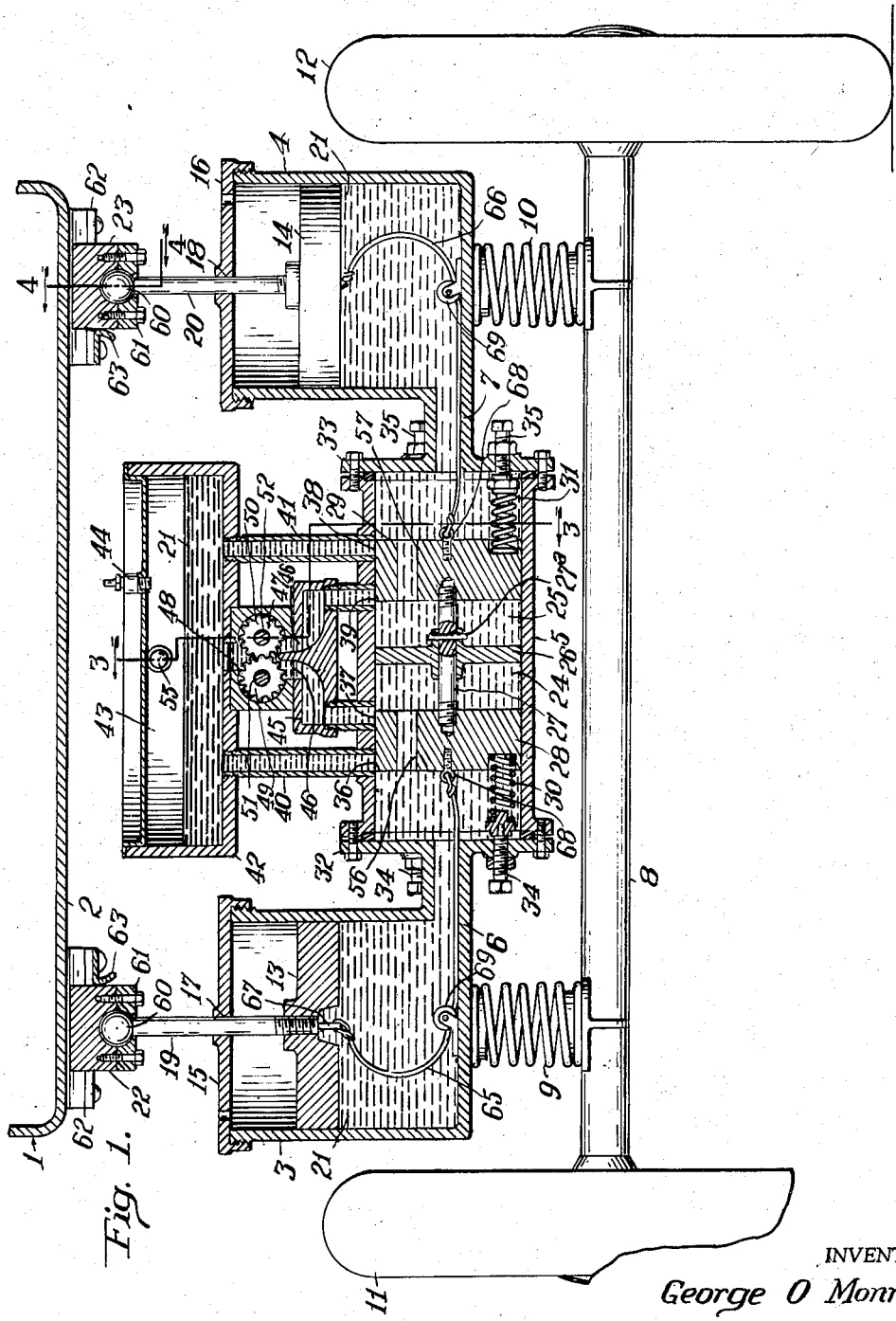
INVENTOR
George O Monnig
BY Shoemaker & Mattare
ATTORNEYS

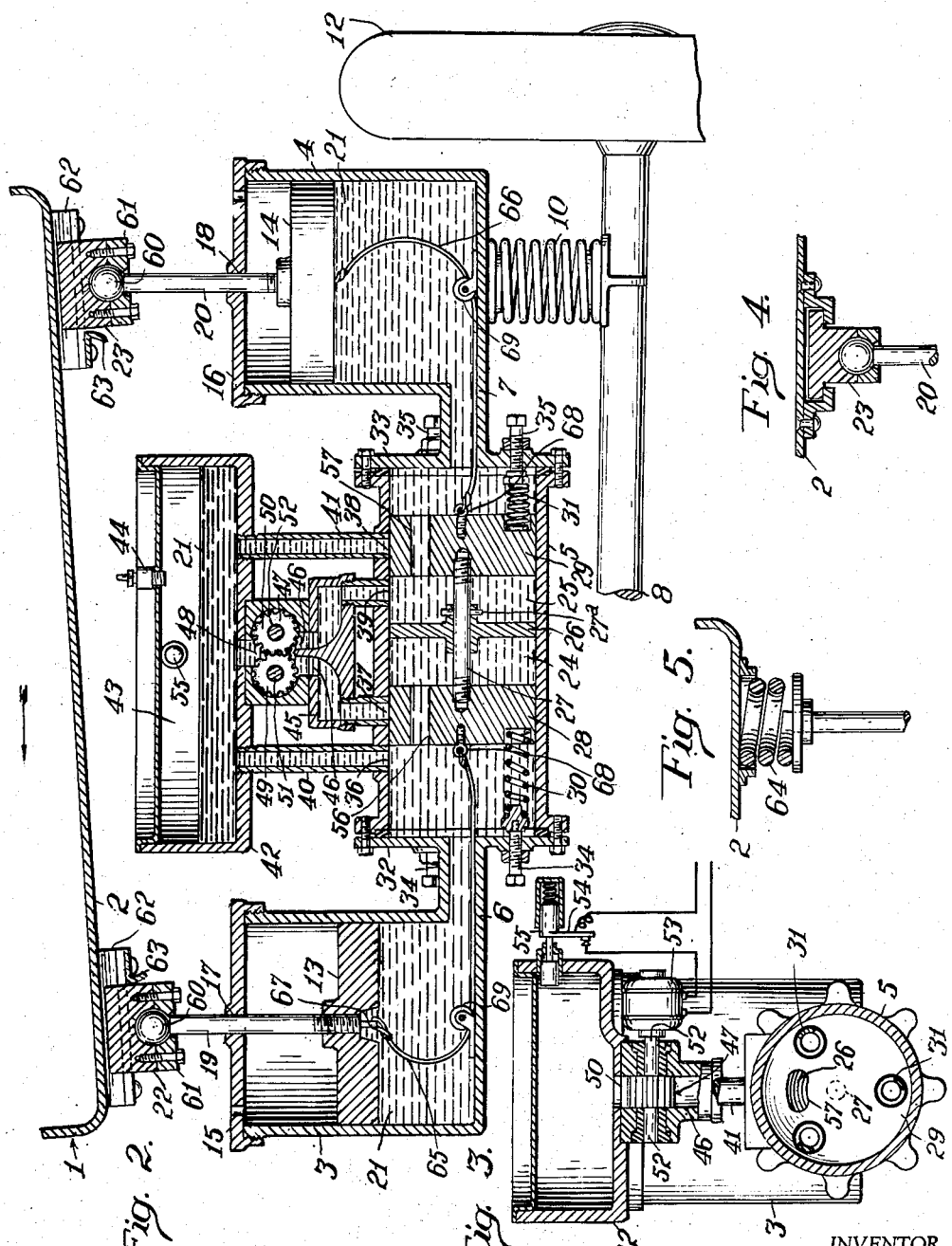

Patented Aug. 25, 1953

2,650,107

UNITED STATES PATENT OFFICE 2,650,107

STABILIZING DEVICE FOR VEHICLES AND OTHER PURPOSES

George O. Monnig, Hampton, Va.

Application January 16, 1950, Serial No. 138,729

10 Claims. (Cl. 280—112)

The invention relates to a stabilizing device for vehicles and various other purposes.

The primary object of the present invention is to provide a stabilizing device for vehicles and various other purposes having a source of reserve energy and which, when applied to a vehicle, is directly responsive to changes in forces affecting the spring supported body and chassis of the vehicle due to centrifugal and other road forces tending to tilt or shift the body of the vehicle either to the right or left, the stabilizing device being adapted to tilt the body in a direction opposite to that in which the centrifugal force tends to tilt the body and with a force due to stored energy greater than said centrifugal force, whereby the vehicle body is quickly restored to normal condition, thereby greatly improving the riding qualities of the vehicle.

When the equalizing device is used to stabilize a vehicle, the vehicle and the stabilizing device are said to be in normal condition whenever the downward force exerted on the road by one side of the vehicle is equal to the downward force exerted on the road by the opposite side of the vehicle. When this condition exists, the vehicle is properly banked and if it is traveling on a curve, any other force tending to make these two forces unequal is referred to hereinafter as a "displacing force." "Displacing," as herein used, refers to a displacement from a condition of force equilibrium and not to a displacement of any material object in space.

The forces affecting the spring supported chassis and body of the vehicle at any instant comes from centrifugal and road forces operating at that instant and the ordinary stabilizing means without a source of reserve energy is consequently unable to tilt a vehicle body against an opposing centrifugal force since to rotate a body or mass in a direction opposed to an applied force requires greater power than the applied force and the expenditure of energy is necessary.

The chief function of all shock absorbers used on vehicles today, as far as I am aware, is to prevent excessive swaying or to keep a vehicle level when going around a curve. The present invention is different in that it accumulates energy by compressing a gas and utilizes this energy to tilt the body of the vehicle in the opposite direction to that in which centrifugal force would tend to tip it. The present invention will prevent excessive swaying and while this is important, it is not the primary object of the invention.

A further object of the invention is to provide a stabilizing device operable substantially instantly to tilt a vehicle body in the opposite direction to that in which centrifugal force tends to tilt it and restore the body to its normal condition and after such restoring operation to cease operation when the displacing force no longer exists and maintain the vehicle body in normal condition, which is the proper banked condition irrespective of the degree of road banking or other conditions, and expend energy only as necessary or required to maintain the vehicle in said normal condition.

An important object of the equalizing device when applied to vehicles is to maintain the body of the vehicle in normal condition when the vehicle is traveling around a curve, whether the curve is properly banked or not properly banked. In banking a road at a curve, the radius of the curve, the inclination of the bank and the speed of the vehicle have to be considered and when the road is properly banked and the car traveling at the speed for which the road is banked, the equalizing device will remain inactive, but should there be any variation in the three factors, namely, the radius of the curve, the inclination of the bank and the speed of the vehicle, the equalizing device will operate and continue to operate to maintain the body of the vehicle in said normal condition until the forces tending to displace the body and produce an operation of the equalizing device cease to exist.

Another object of the invention is to provide means for preventing the jamming of the equalizing mechanism or injuring the same by continued action of a displacing force tending to move one of the side pistons to the extreme upper end of its side cylinder, said means including flexible connections guided at the bottom of the side cylinders and connected at their outer ends with the side pistons and at their inner ends with the piston of the intermediate cylinder and each adapted, when the side piston to which it is connected, closely approaches the upper end of its side cylinder, to be drawn taut and to insure movement of the piston of the intermediate cylinder to a central or approximately central position and thereby interrupt the communication between the pressure reservoir and the side cylinder containing increased pressure and such elevated side piston.

With the above and other objects in view, the invention consists in the construction and novel combination and arrangement of parts hereinafter fully described, illustrated in the accompanying drawings and pointed out in the claims hereto appended, it being understood that various changes in the form, proportions, and minor details of construction, within the scope of the claims, may be resorted to without departing from the spirit or sacrificing any of the advantages of the invention.

In the drawings:

Fig. 1 is a transverse sectional view of a stabilizing device constructed in accordance with this invention and shown applied to a vehicle, the chassis and body of the vehicle being shown diagrammatically;

Fig. 2 is a similar view showing the parts of the stabilizer in a different position;

Fig. 3 is a vertical sectional view taken substantially on the line 3—3 of Fig. 1;

Fig. 4 is a detail sectional view taken on the line 4—4 of Fig. 1;

Fig. 5 is a detail view showing another means for connecting the upper ends of the piston rods of the side pistons with the chassis.

In the accompanying drawings is illustrated one embodiment of the invention in which the stabilizing device is shown applied to a vehicle, the body 1 and the chassis 2 of the vehicle being indicated diagrammatically. The stabilizing device comprises in its construction vertical side cylinders 3 and 4 and an intermediate cylinder 5 which may be arranged horizontally or in any other convenient position, and which is located between and communicates with the side cylinders 3 and 4 by means of horizontal conduits 6 and 7.

The side cylinders 3 and 4 are yieldably mounted upon the axle 8 by main supporting springs 9 and 10. The axle 8, which is diagrammatically shown, may be either the front or rear axle of the vehicle and it has mounted on its ends wheels 11 and 12.

The main supporting springs 9 and 10, which for convenience are illustrated as coil springs, may, of course, be of any desired construction, and the vertical side cylinders 3 and 4 which receive and guide vertically piston heads 13 and 14, are preferably provided at their upper ends with removable heads 15 and 16 having central openings 17 and 18 through which pass piston rods 19 and 20.

The pistons formed by the piston heads and the piston rods are hydraulically supported by liquid 21, preferably consisting of oil, but any other suitable liquid may, of course, be employed. The upper ends of the piston rods 19 and 20 are connected by suitable coupling means 22 and 23 with the chassis and body. Any suitable attaching or coupling means may, of course, be provided, which permit pivotal movement of the chassis and body without lateral strain on the vertically movable piston rods 19 and 20. In the operation of the device one or both of the pistons may be moved vertically and the coupling means should permit the chassis to adjust itself with respect to the vertical movements of the pistons.

The intermediate horizontally disposed cylinder 5 may be supported wholly by the horizontal conduits 6 and 7 which are preferably flanged at their ends and bolted to flanges of the intermediate horizontal cylinder 5, but any additional supporting means may, of course, be provided for the horizontal cylinder which is divided into two chambers 24 and 25 by a centrally arranged piston 26 to which a central horizontal piston rod or stem 27 is secured by a pin 27ª which pierces a hub portion of the piston and the piston rod or stem 27, but the piston 26 may be secured to the piston rod or stem 27 by any other desired means which will hold the parts against relative rotary and sliding movements. The piston rod or stem extends from opposite sides of the piston 26 and is suitably connected at its ends to slidable valves 28 and 29 which are rigid with the central piston 26 and move simultaneously with said piston 26 when the latter is shifted either to the right or left from its central position by action of the hydraulic fluid and also by centering of springs 30 and 31 constituting yieldable means for maintaining the piston 26 normally in a central position. The springs 30 and 31, which are subjected to compression and expansion, are interposed between the slide valves 28 and 29 and the cylinder heads 32 and 33 of the intermediate horizontal cylinder 5. The springs are preferably tensioned by adjusting screws 34 and 35 mounted in threaded openings in the cylinder heads 32 and 33 and adjustable exteriorly of the cylinder 5. When the device is employed for the stabilization of vehicles, it is in the normal condition when the pressures in the side cylinders 3 and 4 are equal. For vehicle stabilization, springs 30 and 31 are adjusted by means of the screws 34 and 35 so that piston 26 is in the center of the intermediate cylinder 5 when the pressures in the side cylinders are equal. In other applications of the device, as stabilizing an object on a rolling ship, springs 30 and 31 may be adjusted by means of the adjusting screws 34 and 35 so that the piston 26 is in the center of intermediate cylinder 5 when there is a certain difference between the pressure in the cylinder 3 and the pressure in the cylinder 4. In every application of the device, the normal condition is the condition existing when the piston 26 is in the center of intermediate cylinder 5. If the device is caused to leave the normal condition by a displacing force which alters the pressure difference in the side cylinders from the pressure difference existing when the device is in normal condition, the device delivers fluid to the side cylinder in which the pressure is increased and continues doing so until the normal condition is reestablished. This tendency to reestablish the normal condition independently of the position of the pistons 13 and 14 is the basis of operation of the device in every application to which it may be put. A plurality of the piston centering springs are preferably provided for each of the valves 28 and 29.

The slide valve 28 controls ports 36 and 37 at the left hand portion of the cylinder 5 and the slide valve 29 controls ports 38 and 39 at the right hand portion of the cylinder 5. The ports 36 and 38 establish communication between vertical conduits 40 and 41 which communicate at their upper ends with a receptacle 42 which is partially filled with hydraulic liquid and which also contains in its upper portion gas 43 under pressure. The gas is preferably air and is introduced into the upper portion of the receptacle through a spring controlled pneumatic valve 44 similar to that provided for pneumatic tires, but any suitable valve may, of course, be provided.

The ports 37 and 39 communicate with the ends of an approximately inverted U-shaped conduit 45 located between the conduits 40 and 41 and spaced from the bottom of the receptacle 42 and suitably secured at its ends to the cylinder 5. The conduit 45 is connected intermediate of its ends with the inlet 46 of a rotary pump 47 which has its outlet 48 located at the bottom of the receptacle 42 and communicating with the interior thereof. Instead of employing a rotary pump any other desired type of pump may, of course, be used.

The pump which is adapted to feed liquid from the conduit 45 to the receptacle 42 and also to build up air pressure within the upper portion of said receptacle may be of any desired construction and it is more or less diagrammatically illustrated as comprising two rotary intermeshing members 49 and 50 mounted on suitable shafts 51 and 52. The shaft 52 preferably extends beyond the pump casing and is operatively connected with an electric motor 53 which is in circuit with and is controlled by a pressure operated switch 54 having a plunger 55 extending into the receptacle at the upper portion thereof above the liquid contained therein and adapted to operate the switch and stop the motor when the pressure of the air reaches a predetermined degree.

The slide valves 28 and 29 are provided with a plurality of passages 56 and 57 to permit the hydraulic pressure medium to pass freely through the valves so that the pressures at opposite sides of the central piston 26 will be the same as the pressures within the right and left hand side cylinders 3 and 4. When the stabilizing device is in normal condition, the ports 37 and 39 are slightly open so that the pump 47 may receive sufficient fluid necessary to build up the pressure in the upper portion of the receptacle 42 to the required value.

In Fig. 1 the stabilizing device is shown applied to a vehicle and is shown in normal condition with the forces on the pistons of the vertical side cylinders equal. If centrifugal force acts on the vehicle body in the direction of the arrow in Fig. 2, then the downward force on the piston of the left hand cylinder 3 will be greater than that on the piston of the right hand side cylinder 4. The pressure in the chamber 24 is the same as in the left hand cylinder 3 and the central piston 26 will be moved to the right against the restoring action of the springs 31. Sliding valves 28 and 29 which are rigidly connected to said central piston 26 are moved to the right and consequently ports 36 and 39 will be opened, the size of the opening depending on the extent of the movement of the central piston 26.

When the port 36 opens and the port 39 is more fully opened, oil or other hydraulic pressure medium contained within the stabilizing device is forced by the compressed gas within the upper portion of the receptacle 42, through the port 36 to side cylinder 3, the springs 31 acting as stop means for the piston 26 so as to effectively apply the pressure for raising the piston in side cylinder 3. The pump 47 also draws fluid from the right hand cylinder 4 and the piston thereof is lowered. Thus the vehicle body is tipped to the right until the forces on the pistons of the side cylinders are equal. When this happens, the restoring springs 31 return the central piston to the center position in intermediate cylinder 5 and the tipping of the vehicle body stops, but the vehicle body is retained tilted to the right, opposite to the direction shown in Fig. 2.

As the centrifugal force decreases, the tilted position of the vehicle body causes the force on the piston of the right hand side cylinder 4 to be greater than on the piston of the left hand side cylinder 3. Central piston 26 then moves to the left and the vehicle body is returned to the normal condition by a reversal of the operation that tilted it to the right.

Energy stored by compression of the gas in the upper portion of the receptacle 42 by the pump 47 is employed for the heavy job of moving the vehicle body against centrifugal force and since a large amount of energy may be stored in this manner, the time response of the stabilizing device can be made sufficiently rapid to insure easy and comfortable riding.

When the vehicle is not used or at rest, pressure throughout the stabilizing device will equalize and the pistons of both side cylinders 3 and 4 will be raised. Upon starting the engine of the motor vehicle and driving the pump, the gas in the upper portion of the receptacle 42 will be compressed and the vehicle body will settle lower.

In addition to stabilization on curves, the stabilizing device will also level a vehicle traveling continuously on a sloping surface and will adjust the vehicle body so that the load on both sides is equal. This will greatly simplify the loading of trucks.

While the stabilizing device has been specifically shown and described as a stabilizing means operating between a running gear and a body of a vehicle for regulating the position of the body to the running gear from time to time during travel of the vehicle, the present invention is also adapted to be advantageously employed for various other purposes, such as supporting a body in unstable equilibrium and maintaining such body normally in a horizontal position or at a desired inclination, such as a gun mount on a vessel afloat, and where the body to be supported is subjected to change of position intermittently or periodically.

The spaced hydraulic means comprising the cylinders 3 and 4 and the pistons 13 and 14 coact mutually oppositely through a hydraulic medium and in a stabilizing operation controlling, through pressure differential, a flow of hydraulic medium under pressure from a reservoir or other source to connect the same with the cylinder subjected to an increase in pressure for admission thereto of hydraulic fluid under pressure to resist body displacing forces and restore the device to its normal condition and maintain the same therein.

While the side cylinders are shown of greater diameter than the intermediate cylinder, the relative sizes of the cylinders and the sizes of the fluid passages and ports may, of course, be varied to suit conditions and any desired pressure may be maintained in the reservoir to secure practically a simultaneous response of the stabilizing device to displacing forces.

When the equalizing device is applied to a vehicle it will be found particularly advantageous for stabilizing the vehicle in traveling around curves, correctly or incorrectly banked, and at various speeds, but its application is not limited to vehicles and it may be employed for various other purposes as will be readily understood, such as its use on ships, for stabilizing gun mounts and also for mounting a gyroscope to cooperate therewith in counteracting or reducing the rolling of the ship, and when so employed will enable the size of the gyroscope to be reduced.

While the reservoir 42 is illustrated in the drawings as located above the intermediate cylinder, it may, of course, be arranged in any other desired or convenient position.

The couplings 22 and 23 for connecting the pistons of the side cylinders with the chassis each consist of a ball 60 formed integral with the piston rod of each side cylinder and arranged within a sectional bearing 61 which is slidably mounted in a guide 62 secured to the housing and disposed transversely thereof and provided at its inner end with a stop 63. The stops 63, as illustrated in Fig. 1 of the drawings, are arranged contiguous to the inner end faces of the sectional bearings 61 and hold the chassis when in horizontal position against transverse movement. When, however, the chassis assumes an inclined position, as illustrated in Fig. 2 of the drawings, the stop 63 at the right hand side of the chassis is carried a limited distance inwardly beyond the sectional bearing. This permits the arcuate movement, due to the transverse inclination of the chassis, and at the same time enables the stops to prevent transverse movement of the chassis when the latter is in a horizontal position. The stops 63 present arcuate faces to the sectional bearings to prevent any binding of the stops and the bearings when the chassis assumes an inclined position.

Instead of employing couplings for connecting the upper ends of the piston rods of the side pistons with the chassis, each side piston rod may be connected with the chassis by a relatively heavy coil spring 64 which will maintain the chassis against transverse movement when the chassis is in a horizontal position and which will be adapted to yield in a transverse direction to permit the chassis to assume an inclined position. The resilient coupling means afforded by the spring 64 will provide an exceedingly simple and efficient construction for connecting the piston rods of the side pistons with the chassis.

In order to prevent jamming of the equalizer by the continued action of a displacing force which would be sufficient to carry either of the side pistons to the upper end of its cylinder, the side pistons are connected with the piston of the intermediate cylinder by flexible connections 65 and 66 connected at their upper outer ends with the side pistons and at their inner ends with the piston of the intermediate cylinder 5 and of a length, when the piston of the intermediate cylinder is in a central position, to permit the side pistons to closely approach but not touch the cylinder heads 15 and 16. The flexible connections may consist of a fine rope of coiled or twisted wires or any other suitable material, a plain wire, a chain, or the like. The upper ends of the flexible connections are preferably secured to ears 67 formed on the lower ends of the piston rods of the side cylinders and preferably located within recesses in the lower faces of the side pistons, but the flexible connections may be secured to the side pistons in any other suitable manner. The inner ends of the flexible connections are preferably secured to eyes 68 provided at the outer sides of the valves 28 and 29, but any other suitable means may be provided for connecting the flexible connections with the piston of the intermediate cylinder or the assembly comprising the piston 26, the piston rod or stem 27 and the valves 28 and 29. The flexible connections extend downwardly from the pistons of the side cylinders to roller guides 69 and extend horizontally therefrom to the eyes 68 of the valves 28 and 29. Any desired form of guide may, of course, be provided for the flexible connections.

The flexible connections are normally not taut, but are of such a length that if one of the side pistons 13 or 14 is at the top of its travel and the flexible connection attached to that piston is taut, then the said assembly will be in a central position in the intermediate cylinder 5. If the side piston being raised by the device is raised to its uppermost position in its side cylinder without the downward forces on the two side pistons becoming equal, then the central piston 26 will be moved by the flexible connection connecting it to the raised piston into a central position in the intermediate cylinder 5. The upward movement of the vertically movable side pistons is arrested when the piston 26 is in a central position in the intermediate cylinder 5, as communication between the pressure reservoir and the side cylinder having the elevated piston is closed and further feed of pressure to said side cylinder is interrupted.

I claim:

1. In combination with a support, a body and a stabilizing device yieldably mounted on said support and including spaced hydraulic means comprising cylinders containing hydraulic medium and pistons connected to and supporting at least part of the weight of the body and subjected to changes in pressure when the body is shifted from normal condition by a displacing force, conduits connecting the cylinders so that the spaced hydraulic means react mutually oppositely with changes in the forces affecting the supported body, a source of hydraulic medium under pressure, conduits connecting said source with said cylinders, and fluid pressure actuated means responsive to and controlled solely by differential pressures in the cylinders for controlling the flow of the hydraulic medium under pressure to conduct the same to the cylinder in which the pressure is increased, whereby the supported body, when shifted from normal condition by a displacing force, will be returned thereto and maintained therein.

2. In combination with a support, a body and a stabilizing device yieldably mounted on said support and including spaced hydraulic means comprising side cylinders and pistons connected to and supporting at least part of the weight of the body and subjected to changes in pressure when the body is shifted from normal condition by a displacing force, an intermediate cylinder connected at its end portions with the side cylinders, said cylinders being adapted to contain hydraulic medium and subject the same to pressure of the weight of the supported body, a reservoir of hydraulic medium under pressure, a piston slidable within the intermediate cylinder and responsive to differential pressures in the side cylinders, valves slidable in the intermediate cylinder and connected with and actuated by the piston thereof for establishing communication between the reservoir and the side cylinders for admission of fluid under pressure from the reservoir to the side cylinder subjected to an increase in pressure when the said body is subjected to a displacing force, and resilient means for restoring the piston to a central position in the intermediate cylinder when the difference between the pressures within the side cylinders becomes equal to a predetermined value.

3. In a stabilizing device of the type described including in combination spaced hydraulic means comprising side cylinders and pistons adapted to support the weight of a body and subjected to changes in pressure when the body is shifted from normal condition by a displacing force, an intermediate cylinder connected at its end portions with the side cylinders, said cylinders being adapted to contain hydraulic medium and subject the same to pressure of the weight of the supported body, a reservoir of hydraulic medium under pressure, a piston slidable within the intermediate cylinder and responsive to differential pressures in the side cylinders, valves slidable in the intermediate cylinder and connected with and actuated by the piston thereof for establishing communication between the reservoir and the side cylinders for admission of fluid under pressure from the reservoir to the side cylinder subjected to an increase in pressure when the said body is subjected to a displacing force, said reservoir having a compressed gas space located above the contained hydraulic medium, and means for compressing gas within said space for maintaining the pressure of the hydraulic medium at a predetermined value.

4. In a stabilizing device of the type described including in combination spaced hydraulic means comprising side cylinders and pistons adapted to support the weight of a body and subjected to changes in pressure when the body is shifted from normal condition by a displacing force, an intermediate cylinder connected at its end portions with the side cylinders, said cylinders being adapted to contain hydraulic medium and subject the same to pressure of the weight of the supported body, a reservoir of hydraulic medium under pressure, a piston slidable within the intermediate cylinder and responsive to differential pressures in the side cylinders, valves slidable in the intermediate cylinder and connected with and actuated by the piston thereof for establishing communication between the reservoir and the side cylinders for admission of fluid under pressure from the reservoir to the side cylinder subjected to an increase in pressure when the said body is subjected to a displacing force, said reservoir having a compressed gas space located above the contained hydraulic medium, and a fluid pump having an inlet communicating with the intermediate cylinder and an outlet communicating with the reservoir and operable to compress the gas within the upper portion of the reservoir.

5. A stabilizing device of the type described including in combination spaced hydraulic means comprising side cylinders and pistons adapted to support the weight of a body and subjected to changes in pressure when the body is shifted from normal condition by a displacing force, an intermediate cylinder communicating at its ends with the side cylinders, said cylinders being adapted to contain a hydraulic medium and subject the same to pressure produced by the weight of the supported body, a piston slidable in the intermediate cylinder and responsive to differential pressures in the side cylinders, a reservoir for hydraulic medium under pressure, a central conduit having terminal portions communicating with the intermediate cylinder at points spaced from and between the side conduits, a fluid pump having an inlet communicating with the central conduit between the ends thereof, and an outlet communicating with the reservoir, and valves slidable within the intermediate cylinder and connected with and actuated by the piston thereof and controlling the flow of hydraulic medium through the said conduits.

6. In combination with a vehicle having an axle, main supporting springs mounted thereon, and a body located above and spaced from the supporting springs, of a stabilizing device supported upon said main springs of the vehicle and including spaced hydraulic means comprising cylinders containing hydraulic medium and pistons supporting the weight of the body and subjected to unequal pressure when the body is shifted from normal condition by road and centrifugal forces, conduits connecting the cylinders so that the spaced hydraulic means react mutually oppositely with changes in the forces affecting said vehicle body, a source of hydraulic medium under pressure, conduits connecting said source with the cylinders, and means responsive to differential pressures in the cylinders for controlling the flow of hydraulic medium under pressure for admission of the same to the cylinder containing the greater pressure, whereby the supported body, when shifted from normal condition by a displacing force, will be returned thereto and maintained therein.

7. In combination with a support, a body and a stabilizing device, spring means supporting said device on said support, said device including spaced hydraulic means comprising side cylinders and pistons connected to and supporting at least part of the weight of the body, an intermediate cylinder communicating at its ends with the side cylinders, said cylinders being adapted to contain a hydraulic medium and subject the same to pressures produced by the weight of the supported body, a piston slidable in the intermediate cylinder and responsive to differential pressures in the side cylinders, a reservoir for hydraulic medium under pressure, means controlled by the piston of the intermediate cylinder for establishing communication between the reservoir and the side cylinders for admission of fluid under pressure from the reservoir to the side cylinder subjected to an increase in pressure when said body is subjected to a displacing force, and yieldable means for urging the piston of the intermediate cylinder toward a predetermined position therein and for moving the said piston to a position in the center of the intermediate cylinder when said displacing force ceases to exist.

8. A stabilizing device of the type described including in combination spaced hydraulic means comprising side cylinders and pistons adapted to support the weight of a body, an intermediate cylinder communicating at its ends with the side cylinders, said cylinders being adapted to contain a hydraulic medium and subject the same to pressures produced by the weight of the supported body, a piston slidable in the intermediate cylinder and responsive to differential pressures in the side cylinders, a reservoir for hydraulic medium under pressure, means controlled by the piston of the intermediate cylinder for establishing communication between the reservoir and the side cylinders for admission of fluid under pressure from the reservoir to the side cylinder subjected to an increase in pressure when said body is subjected to a displacing force, yieldable means for urging the piston of the intermediate cylinder toward a predetermined position therein and for moving the said piston to a position in the center of the intermediate cylinder when said displacing force ceases to exist.

9. In a stabilizing device of the type described including in combination spaced hydraulic means comprising side cylinders and pistons adapted to support the weight of a body and subjected to changes in pressure when the body is shifted from normal condition by a displacing force, an intermediate cylinder connected at its end portions with the side cylinders, said cylinders being adapted to contain hydraulic medium and subject the same to pressure of the weight of the supported body, a reservoir of hydraulic medium under pressure, a piston slidable within the intermediate cylinder and responsive to differential pressures in the side cylinders, means controlled by the piston of the intermediate cylinder for establishing communication between the reservoir and the side cylinders for admission of fluid under pressure from the reservoir to the side cylinder subjected to an increase in pressure when the said body is subjected to a displacing force, and mechanical means for connecting the side pistons with the piston of the intermediate cylinder for positively returning the same to its central position in the intermediate cylinder when either of the side pistons approximates the limit of its upward movement.

10. In a stabilizing device of the type described including in connection spaced hydraulic means comprising side cylinders and pistons adapted to support the weight of a body and subjected to changes in pressure when the body is shifted from normal condition by a displacing force, an intermediate cylinder connected at its end portions with the side cylinders, said cylinders being adapted to contain hydraulic medium and subject the same to pressure of the weight of the supported body, a reservoir of hydraulic medium under pressure, a piston slidable within the intermediate cylinder and responsive to differential pressures in the side cylinders, means controlled by the piston of the intermediate cylinder for establishing communication between the reservoir and the side cylinders for admission of fluid under pressure from the reservoir to the side cylinder subjected to an increase in pressure when the said body is subjected to a displacing force, and guided flexible connections connected with the side pistons and with the piston of the intermediate cylinder and of a length to return the piston of the intermediate cylinder to a central position therein when either of the side pistons approximates the limit of its upward movement.

GEORGE O. MONNIG.

References Cited in the file of this patent

UNITED STATES PATENTS

| Number | Name | Date |
|---|---|---|
| 2,365,095 | Miller | Dec. 12, 1944 |
| 2,423,264 | Stephens | July 1, 1947 |
| 2,460,774 | Trautman | Feb. 1, 1949 |
| 2,474,471 | Dolan | June 28, 1949 |